United States Patent
Chen et al.

(10) Patent No.: US 11,501,583 B2
(45) Date of Patent: Nov. 15, 2022

(54) VEHICLE BATTERY HEALTH MEASUREMENT AND CONTROL SYSTEMS AND METHODS

(71) Applicant: Ford Global Technologies, LLC, Dearborn, MI (US)

(72) Inventors: Hanyang B. Chen, Canton, MI (US); Michael J. Irby, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 542 days.

(21) Appl. No.: 16/407,019

(22) Filed: May 8, 2019

(65) Prior Publication Data

US 2020/0357197 A1    Nov. 12, 2020

(51) Int. Cl.
*G07C 5/08*    (2006.01)
*H01M 10/48*   (2006.01)
*G07C 5/00*    (2006.01)

(52) U.S. Cl.
CPC .............. *G07C 5/08* (2013.01); *G07C 5/006* (2013.01); *H01M 10/482* (2013.01); *H01M 10/486* (2013.01); *H01M 10/488* (2013.01); *H01M 2220/20* (2013.01)

(58) Field of Classification Search
CPC ............ H01M 10/482; H01M 10/486; H01M 10/488; H01M 2220/20; H01M 10/625; H01M 10/63; H01M 2220/00; H01M 10/48; G07C 5/08; G07C 5/006; G07C 5/00; Y02T 10/7011; Y02T 10/7044; Y02T 10/705; G01R 31/367; G01R 31/3842; G01R 31/392; H02J 7/00; H02J 7/04; H02J 7/0121; H02J 7/042; H02J 7/045;

(Continued)

(56) References Cited

U.S. PATENT DOCUMENTS 4,888,716 A    12/1989   Ueno
7,061,246 B2   6/2006    Dougherty et al.

(Continued)

FOREIGN PATENT DOCUMENTS

WO    2010055271    5/2010

OTHER PUBLICATIONS

Ross Kerley, *Automotive Lead-Acid Battery State-of-Health Monitoring System*, 2014, retrieved from https://vtechworks.iib.vt.edu/bitstream/handle/10919/64870/Kerley RA T 2014.pdf?sequence=1 on May 6, 2019, 60 pages.

*Primary Examiner* — Anthony R Jimenez
(74) *Attorney, Agent, or Firm* — Frank Lollo; Eversheds Sutherland (US) LLP

(57) ABSTRACT

Systems and methods for monitoring the health of a vehicle battery are described, in which an example vehicle includes a vehicle battery, one or more vehicle battery sensors, and a processor. The processor is configured to determine a battery health metric of the vehicle battery, wherein the battery health metric is based on a battery service time, a battery state of charge, and a battery temperature. The processor is also configured to perform a battery refresh operation on the vehicle battery responsive to determining that the battery health metric is above a refresh threshold. And the processor is further configured to activate a vehicle alert responsive to determining that the battery health metric is above an end-of-life threshold.

20 Claims, 3 Drawing Sheets

(58) Field of Classification Search
CPC ........ G06F 1/00; G06F 1/3212; B60W 20/13; B60W 10/26
USPC ...................................................... 701/33.9
See application file for complete search history.

(56) References Cited

U.S. PATENT DOCUMENTS

| | | | | |
|---|---|---|---|---|
| 7,570,022 | B2* | 8/2009 | Zettel | ........................ H02J 7/14 |
| | | | | 320/132 |
| 8,924,043 | B2* | 12/2014 | Maslyn | ................... B60L 58/20 |
| | | | | 701/2 |
| 9,187,007 | B2 | 11/2015 | Li et al. | |
| 9,846,198 | B2* | 12/2017 | Butzmann | .......... G01R 31/3835 |
| 2005/0017685 | A1 | 1/2005 | Rees et al. | |
| 2007/0239374 | A1* | 10/2007 | Dougherty | ........... G01R 31/392 |
| | | | | 702/63 |

* cited by examiner

VEHICLE BATTERY HEALTH MEASUREMENT AND CONTROL SYSTEMS AND METHODS

TECHNICAL FIELD

The present disclosure generally relates to vehicle battery control systems and methods and, more specifically, systems and methods for measuring a vehicle battery health metric, and taking one or more actions based on the battery health metric.

BACKGROUND

Modern vehicles may include one or more lead acid batteries for providing power to various vehicle systems. With proper operation conditions, the lead acid battery of a given vehicle can have long usable life. Vehicle lead acid batteries, in particular, may operate under more severe operation conditions than a battery used in industry. As such, the typical usable life may be less than 10 years for a vehicle battery.

Recently, more and more features have been added in new vehicles to provide fuel-economy improvement. These features are operated with additional usage of the battery, and cause more severe operation conditions. Therefore, the vehicle battery life is further reduced.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle battery management in a vehicle. An example disclosed vehicle includes a vehicle battery, one or more vehicle battery sensors, and a processor. The processor is configured to determine a battery health metric of the vehicle battery, wherein the battery health metric is based on a battery service time, a battery state of charge, and a battery temperature, perform a battery refresh operation on the vehicle battery responsive to determining that the battery health metric is above a refresh threshold, and activate a vehicle alert responsive to determining that the battery health metric is above an end-of-life threshold.

An example disclosed method includes determining a battery health metric of a vehicle battery, wherein the battery health metric is based on a battery service time, a battery state of charge, and a battery temperature. The method also includes performing a battery refresh operation on the vehicle battery responsive to determining that the battery health metric is above a refresh threshold. And the method further includes activating a vehicle alert responsive to determining that the battery health metric is above an end-of-life threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
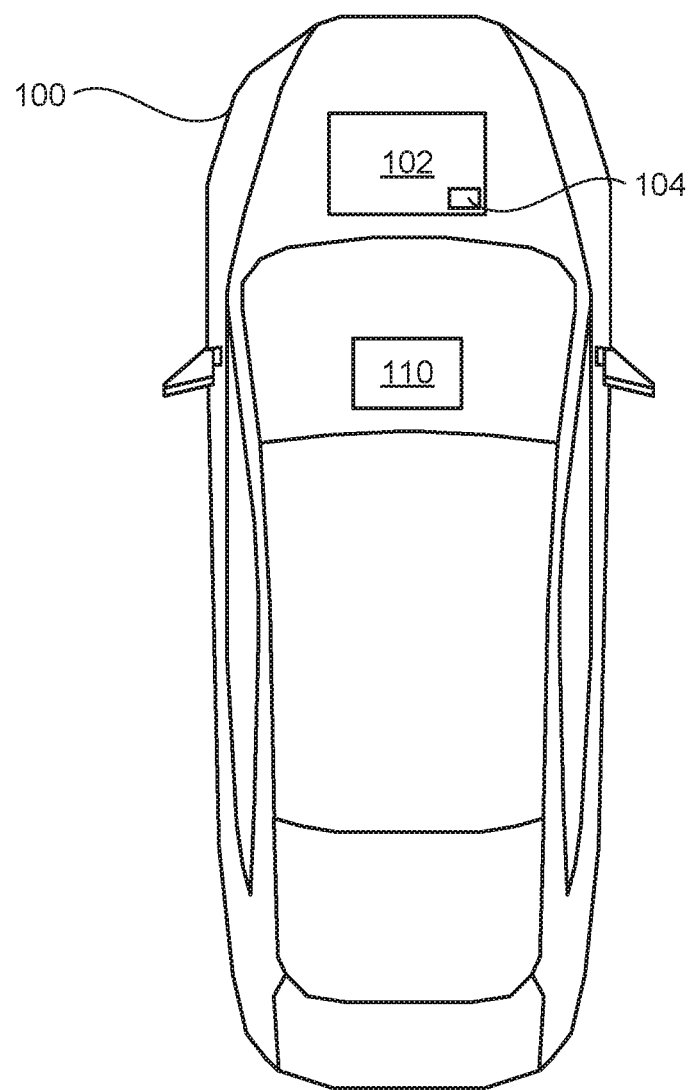
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, embodiments herein are directed to battery health determination and management in vehicles. Examples include innovative designs for battery life evaluation based on battery service time weighted by temperature and state of charge (SOC). BMS (Battery Management System) control algorithms are also disclosed for battery life and vehicle fuel efficiency improvement. In addition, warning message is created for Ford Customer Service and customer when it is detected that battery is approaching EOL (End-of-Life).

Vehicle batteries may typically have a corresponding service time, or a time for which a battery has been installed in a vehicle. The service time may increment every second, and may provide a course measure of the battery health based on age. Various vehicle systems and functions may make use of this battery service time information, to provide a longer battery life and more robust vehicle systems. For example, a vehicle may include the ability to perform a battery refresh operation. The battery refresh operation may be carried out every so often (e.g., every 40 days), in order to reverse battery sulfation before it becomes permanent and reduces the life of the battery.

Examples disclosed herein may include determining a battery health metric that provides a more accurate measure of the health of the battery. The battery health metric may be similar to the battery service time, but weighted by a battery temperature and a battery state of charge. The temperature and state of charge values correspond to operating conditions of the battery, which impact the overall health and longevity of the battery. For example, a battery that operates consistently in low SOC settings may "age" faster than an identical battery that operates in high SOC settings. The faster "aging" of the battery in low SOC operation can lead to reduced capacity and other operational characteristics faster than expected. As such, the battery health metric that takes into account the temperature and state of charge over time can provide a more accurate measure of the battery health, so that the battery can be refreshed only when needed (and more quickly after it is determined that a refresh is needed) and replaced if necessary. Further, the battery health metric can be used in part to determine whether to turn off one or more vehicle systems, so as to avoid causing unnecessary damage to the battery and reducing the battery lifespan.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a battery 102, one or more vehicle battery sensors 104, and a processor or power management system 110. The battery 102 may be any battery suitable for use in a vehicle. For instance, battery 102 may be a 12V lead-acid battery. Battery 102 may also have one or more corresponding metrics, such as a maximum capacity, a state of charge (SOC), temperature, voltage, current, and more. Over time, the capacity may degrade, such that a battery previously able to be charged to 100% of rated capacity of a new battery (typically with unit of AmpHour) may only be able to reach 75% or lower of the rated value, regardless of the time for which the battery is charged.

Lab tests and field data have shown that battery life is strongly dependent on battery temperature. Typically, a battery's usable life is reduced to approximately half if the battery temperature is increased by about 8-10 degrees C. Battery life is also strongly dependent on battery SOC. Low SOC allows battery sulfation to accumulate much faster than with a fully charged or high SOC battery. Battery sulfation will convert from reversible sulfation to permanent sulfation in days or weeks if it is not recovered properly, for example by using a battery refresh operation. Permanent sulfation is one of the main causes of battery failure.

Examples disclosed herein may be configured to estimate a remaining battery life based on battery operation conditions such as battery temperature and SOC.

Battery sensor(s) 104 provide measured parameters of the battery 102. For example, this can include a charging and discharging voltages, current, temperature, and more. Battery SOC and SOH (state of health) may be determined by these measured battery parameters.

Processor 110 may be configured to determine a battery health metric of the vehicle battery 102 based on battery service time, a battery temperature, and a battery SOC. The battery health metric may be a weighted service time, wherein the service time is weighted by values depending on the measured temperature and SOC.

In some examples, the battery health metric comprises a time-based metric, and the battery health metric is updated at a regular interval based on (i) the battery service time during the regular interval and (ii) a multiplier determined based on the battery state of charge and the battery temperature during the regular interval.

For example, the battery service time may update every second by adding 1 to a stored value, thereby indicating the number of seconds that the battery has been in service. This value may be saved in EEPROM of the vehicle 100 to protect against power loss.

Similarly, the battery health metric may update every second as well, but by adding some function of the service time rather than simply adding 1 to the value every second. Example weights for the temperature and SOC which are used to determine the weighting factor are included below:

TABLE ONE

WeightingFactorTempSOC - weighting factor for battery temperature and SOC

|          | 0%  | 20% | 40% | 60%  | 70% | 80% | 95% |
|----------|-----|-----|-----|------|-----|-----|-----|
| 0 Deg C  | 45  | 18  | 7.2 | 3.15 | 1.8 | 1.1 | 0.9 |
| 25 Deg C | 50  | 20  | 8   | 3.5  | 2   | 1.2 | 1   |
| 35 Deg C | 100 | 40  | 16  | 7    | 4   | 3   | 2   |
| 45 Deg C | 200 | 80  | 32  | 14   | 8   | 6   | 4   |
| 55 Deg C | 400 | 160 | 64  | 28   | 16  | 12  | 8   | values in this table are for reference only

As can be seen in Table one, some examples may include a multiplier that has an inverse and/or direct relationship with the temperature and/or SOC. In a particular example, the weighting factor has an inverse relationship with the battery state of charge, and a direct relationship with the battery temperature.

For each second (or for each other regular interval), the value of the battery health metric increases by a base value multiplied by the weighting factor. The base value may be one for a determination every second, five for a determination every five seconds, or may be some other value. As can be seen in the weighting factors of Table 1, the battery health metric has the possibility to increase faster or slower than the service time value (depending on the operating conditions). This difference between the battery health metric and the service time value is what provides a more accurate indication of the effective "age" of the battery.

Alternative weighting factors may be used as well, such as the service time weighted by SOC (i.e., without weighting based temperature), service time weighted by temperature (i.e., without weighting based on SOC), and/or service time weighted by charging conditions (e.g., charging voltage and/or current).

In some examples, the processor 110 may be configured to perform a battery refresh operation on the vehicle battery 102 responsive to determining that the battery health metric is above a refresh threshold.

Battery sulfation is one of the main causes of battery failure. A refresh operation may be used to recover reversible sulfation in the battery 102 to provide a longer battery life. While operating in a refresh mode, the battery 102 is charged with a high voltage (i.e., higher than a nominal charging voltage) to recover reversible sulfation (or so-called soft sulfation) which has recently accumulated in the battery. If no refresh operation is performed, the reversible sulfation will eventually be converted to hard sulfation (or so-called permanent sulfation that cannot be reversed, leading to a permanent reduction in battery capacity).

In some examples, a vehicle may be configured to enter a refresh mode every 40 days (or some other amount). Up to five hours of accumulated engine running are required to complete a refresh operation. In the United States, the average daily commuting time is about 50 minutes. Therefore, vehicles that enter a refresh operation every 40 days can expect to operate more than 20% of the time within a refresh mode. When operating in the refresh mode, one or more vehicle functions used for vehicle fuel economy improvement may be disabled. As such, it is beneficial to provide a more accurate indication of when a battery refresh operation is needed to remove soft sulfation.

Battery sulfation is accumulated substantially faster by a battery having a low SOC and a high temperature. Under some existing designs, the average waiting time for a next refresh mode is 20 days, even after the battery has had a low SOC for several days and unexpected sulfation has been accumulated. If a refresh operation is performed immediately after sulfation has been generated, it is more effective at removing that sulfation. Thus, it may be beneficial to implement a refresh operation immediately after the battery has had a low SOC (for example, less than 40% over a weekend). Therefore, battery life is protected from unexpected sulfation.

Existing designs may cause a vehicle to enter a refresh mode every 40 days, regardless of the battery SOC status during those 40 days. Examples disclosed herein, alternatively, enable the vehicle to perform the refresh operation less often (e.g., every 120 days), so long as the battery operating conditions are good. This can enable the vehicle to spend less time in a refresh mode, and therefore spend less time with vehicle functions disabled. Therefore, vehicle fuel economy is increased without sacrificing battery life.

In a particular scenario in which a battery has been with very low SOC (<40%, a typical scenario before vehicle jump start) for a couple of days, it is beneficial to perform a battery refresh operation immediately after the engine has started. However, existing designs still cause the vehicle to wait for an averaged time of 20 days before performing the next refresh operation. This can lead to permanent sulfation and reduction in the life of the battery.

In some examples, the refresh threshold may be a time value i.e., 120 days. The refresh threshold may comprise a threshold change in the battery health metric, and performing the battery refresh operation on the vehicle battery responsive to determining that the battery health metric is above the refresh threshold may comprise determining that a change in the battery health metric is greater than the threshold change in the battery health metric. For instance, if the threshold is 120 days, the refresh operation may be performed responsive to determining that the battery health metric has increased by 120 days since the last performed refresh operation.

As a result, if the battery is healthy, the refresh operation is performed less often for better fuel economy. And if the battery is not healthy or is operating under poor conditions, the refresh operation is performed more often for battery life protection.

During performance of the refresh operation, one or more vehicle functions may be disabled. For instance, the vehicle may disable an automatic start/stop function, a smart regenerative charging function, and/or other fuel efficiency systems that improve fuel efficiency at the expense of battery operating conditions.

Processor 110 may also be configured to activate a vehicle alert responsive to determining that the battery health metric is above an end-of-life threshold. End of life may be a scenario in which (i) the battery 102 is fully charged and its engine cranking capability is substantially lower (e.g., 50% lower) than a rated value of a new battery, or (ii) the battery 102 is fully charged and its standard discharging capacity in AmpHour is lower (e.g., 50% lower) than a rated value of a new battery.

The end-of-life threshold may be some amount of time (e.g., 10 years). So for a battery that ages quickly due to poor operating conditions, the battery health metric may equate to 10 years even when the service time is much less (e.g., five years or even fewer).

In some examples, the alert may be visual, audible, haptic, etc. The alert may be displayed or emitted via a center console display, speakers, or other system or device of the vehicle 100. In some examples, the processor 110 may transmit the alert to a centralized server or other computing device, such as a device controlled by the vehicle manufacturer or a mechanic. This can allow the manufacturer and/or a mechanic that the battery 102 is nearing its end of life and should be replaced. Transmittal of the alert may be done via the communication system 230 described below with respect to FIG. 2.

The end-of-life threshold is different than the battery refresh threshold. In some examples, the processor 110 can also disable or reduce one or more vehicle functions responsive to determining that the battery health metric is greater than the end-of-life threshold. This can include reducing or disabling the automatic stop/start function, smart regenerative charging, and more.

In some examples, the processor 110 may be configured to reset the battery health metric responsive to installation of a new battery.

In some examples, the processor 110 is further configured to determine a vehicle automotive safety integrity level (ASIL) based on the battery health metric. The processor may compare the battery health metric to an ASIL threshold, that is different from the refresh threshold and the end-of-life threshold.

Vehicles are adding more critical features such as autonomous control, remote park assist, and more, which require higher safety levels of the corresponding battery (from QM to ASIL-A, ASIL B/C, ASIL-D, etc.). The battery health metric may be used as a parameter suitable for evaluation of battery safety level in the vehicle. For example, when a new ASIL-D level battery is installed in vehicle, its safety level will be reduced after it has been used for a certain number of years with certain operational conditions. The battery health metric can be used to determine when an ASIL level of the battery should be reduced, and responsively whether one or more vehicle functions should be disabled (i.e., autonomous control, remote park assist, etc.). Critical vehicle operations with high ASIL-level requirement may be disabled if the battery health metric is determined to be greater than the ASIL threshold. In addition, a warning message may be emitted.

In some examples, a vehicle may include two or more batteries. In these examples, each battery may be independently monitored and controlled, such that the features disclosed herein may be independently applied to each battery. Each battery may have an independent temperature, SOC, and battery health metric.

Figure 2:
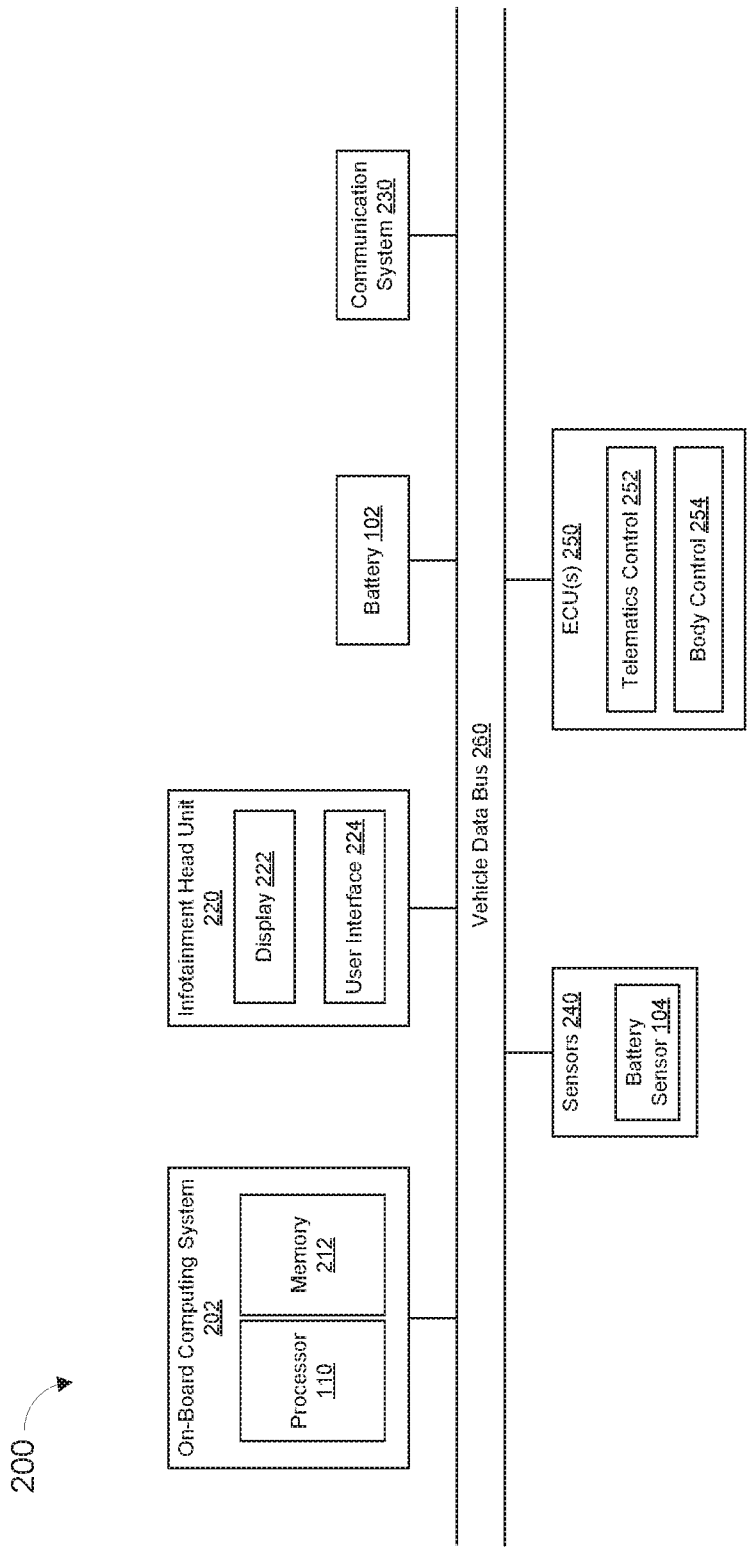
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include an on-board computing system 202, infotainment head unit 220, battery 102, communication system 230, sensors 240, electronic control unit(s) 250, and vehicle data bus 260.

The on-board computing system 202 may include a microcontroller unit, controller or processor 210 and memory 212. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222 and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 202. Additionally, the infotainment head unit 220 may display the infotainment system on, for example, a center console display of vehicle 100 (such as display 222).

The communication system 230 includes wired or wireless network interfaces to enable communication with external networks. The communication system 230 also includes hardware (e.g., processors, memory, storage, antenna, etc.) and software to control the wired or wireless network interfaces. In the illustrated example, the communication system 230 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.). In some examples, the communication system 230 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The sensors 240 are arranged in and/or around the vehicle 100. For example, battery sensor 104 may be mounted to the battery 102 to measure a temperature of the battery 102. Other sensors are possible as well.

The ECUs 250 may monitor and control subsystems of vehicle 100. One or more ECUs may be enabled, disabled, or otherwise modified to reduce a power draw of the ECU. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252 and the body control unit 254.

The telematics control unit 252 may control tracking of the vehicle 100, for example, using data received by a GPS receiver, communication module, and/or one or more sensors. The body control unit 254 may control various subsystems of the vehicle 100. For example, the body control unit 254 may control power a trunk latch, windows, power locks, power moon roof control, an immobilizer system, and/or power mirrors, etc.

Vehicle data bus 260 may include one or more data buses that communicatively couple the on-board computing system 202, infotainment head unit 220, battery 102, communication system 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
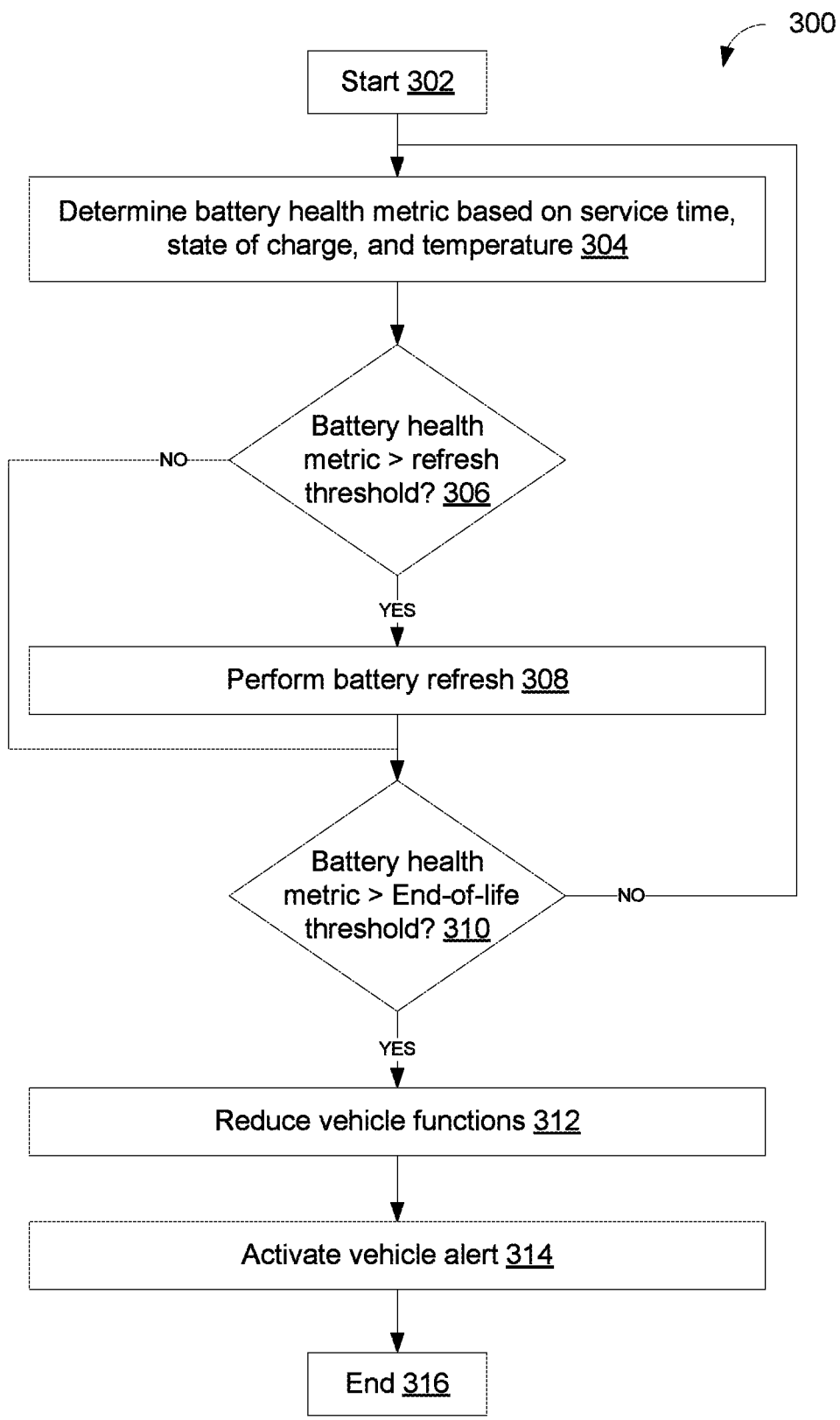
FIG. 3 illustrates a flowchart of an example method according to embodiments of the present disclosure.

FIG. 3 illustrates a flowchart of an example method 300 according to embodiments of the present disclosure. Method 300 may enable one or more systems to determine the status of a vehicle battery, and carry out one or more actions based on the vehicle battery status. The flowchart of FIG. 3 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include determining a battery health metric based on the service time, state of charge, and temperature of the battery.

At block 306, method 300 may include determining whether the battery health metric is greater than a refresh threshold. As noted above, this can include determining whether the battery health metric has increased by some threshold amount since a last refresh operation was performed. If it is determined that he battery health metric is greater than the refresh threshold, method 300 may include performing a battery refresh operation.

At block 308, method 300 may include determining whether the battery health metric is greater than an end-of-life threshold. If it is, method three may include reducing or disabling one or more vehicle functions, such as automatic start/stop, smart regenerative charging, and more. At block 314, method 300 may include activating a vehicle alert. This alert may indicate that the battery has reached or is approaching an end-of-life, and that the battery should be replaced.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method comprising:
   determining a battery health metric of a first vehicle battery, wherein the battery health metric is based on a battery service time, a battery state of charge, and a battery temperature;
   performing a battery refresh operation on the first vehicle battery responsive to determining that the battery health metric is above a battery refresh threshold; and
   activating a vehicle alert responsive to determining that the battery health metric is above an end-of-life threshold, wherein the end-of-life threshold is based on the first vehicle battery being fully charged, an engine cranking capability being lower than a first rated value of a second vehicle battery, and a standard discharging capacity being lower than a second rated value of the second vehicle battery, wherein the second vehicle battery is new.

2. The method of claim 1, wherein the battery health metric of the first vehicle battery is a first battery health metric of the first vehicle battery of a vehicle, and wherein the battery refresh threshold is a first battery refresh threshold, and wherein the vehicle alert is a first vehicle alert, and wherein the end-of-life threshold is a first end-of-life threshold, further comprising:
   determining a second battery health metric of a third vehicle battery of the vehicle;
   performing the battery refresh operation on the first vehicle battery responsive to determining that the first battery health metric is above the first battery refresh threshold;
   performing the battery refresh operation on the third vehicle battery responsive to determining that the second battery health metric is above a second battery refresh threshold;
   activating the first vehicle alert responsive to determining that the first battery health metric is above the first end-of-life threshold, wherein the first end-of-life threshold is based on the first vehicle battery being fully charged, the engine cranking capability being a first engine cranking capability that is lower than the first rated value of the second vehicle battery, and the standard discharging capacity being a first standard discharging capacity that is lower than the second rated value of the second vehicle battery; and
   activating a second vehicle alert responsive to determining that the second battery health metric is above a second end-of-life threshold, wherein the second end-of-life threshold is based on the third vehicle battery being fully charged, a second engine cranking capability being lower than the first rated value of the second vehicle battery, and a second standard discharging capacity being lower than the second rated value of the second vehicle battery.

3. The method of claim 1, further comprising determining a vehicle automotive safety integrity level (ASIL) based on the battery health metric.

4. The method of claim 1, further comprising resetting the battery health metric responsive to installation of the second a new vehicle battery.

5. The method of claim 1, wherein the battery refresh threshold is different than the end-of-life threshold.

6. The method of claim 1, further comprising disabling one or more vehicle functions that improve fuel efficiency at the expense of battery operating conditions during performance of the battery refresh operation, and wherein the one or more vehicle functions comprise smart regenerative charging and automatic start/stop functions.

7. The method of claim 1, wherein the battery health metric comprises a time-based metric, and wherein the battery health metric is updated at a regular interval based on (i) the battery service time during the regular interval and (ii) a weighting factor determined based on the battery state of charge and the battery temperature during the regular interval.

8. The method of claim 7, wherein the weighting factor determined based on the battery state of charge and the battery temperature has an inverse relationship with the battery state of charge, and a direct relationship with the battery temperature.

9. The method of claim 1, wherein the battery refresh threshold comprises a threshold change in the battery health metric, and wherein performing the battery refresh operation on the first vehicle battery responsive to determining that the battery health metric is above the battery refresh threshold comprises determining that a change in the battery health metric is greater than the threshold change in the battery health metric.

10. The method of claim 9, wherein the threshold change in the battery health metric comprises the threshold change in the battery health metric since a performance of a last battery refresh operation.

11. A vehicle comprising:
a first vehicle battery;
one or more vehicle battery sensors; and
a processor configured to:
determine a battery health metric of the first vehicle battery, wherein the battery health metric is based on a battery service time, a battery state of charge, and a battery temperature;
perform a battery refresh operation on the first vehicle battery responsive to determining that the battery health metric is above a battery refresh threshold; and
activate a vehicle alert responsive to determining that the battery health metric is above an end-of-life threshold, wherein the end-of-life threshold is based on the vehicle battery being fully charged, an engine cranking capability being lower than a first rated value of a second vehicle battery, and a standard discharging capacity being lower than a second rated value of the second vehicle battery, wherein the second vehicle battery is new.

12. The vehicle of claim 11, wherein the battery health metric is a first battery health metric, and wherein the battery refresh threshold is a first battery refresh threshold, and wherein the vehicle alert is a first vehicle alert, and wherein the end-of-life threshold is a first end-of-life threshold, the vehicle further comprising a third vehicle battery, and wherein the processor is further configured to:
determine a second battery health metric of the third vehicle battery of the vehicle;
perform the battery refresh operation on the first vehicle battery responsive to determining that the first battery health metric is above the first battery refresh threshold;
performing the battery refresh operation on the third vehicle battery responsive to determining that the second battery health metric is above a second battery refresh threshold;
activating the first vehicle alert responsive to determining that the first battery health metric is above the first end-of-life threshold, wherein the first end-of-life threshold is based on the first vehicle battery being fully charged, the engine cranking capability being a first engine cranking capability that is lower than the first rated value of the second vehicle battery, and the standard discharging capacity being a first standard discharging capacity that is lower than the second rated value of the second vehicle new battery; and activating a second vehicle alert responsive to determining that the second battery health metric is above a second end-of-life threshold, wherein the second end-of-life threshold is based on the third vehicle battery being fully charged, a second engine cranking capability being lower than the first rated value of the second vehicle battery, and a second standard discharging capacity being lower than the second rated value of the second vehicle battery.

13. The vehicle of claim 11, wherein the processor is further configured to determine a vehicle automotive safety integrity level (ASIL) based on the battery health metric.

14. The vehicle of claim 11, wherein the processor is further configured to reset the battery health metric responsive to installation of the second vehicle battery.

15. The vehicle of claim 11, wherein the battery refresh threshold is different than the end-of-life threshold.

16. The vehicle of claim 11, wherein the processor is further configured to disable one or more vehicle functions that improve fuel efficiency at the expense of battery operating conditions during performance of the battery refresh operation, and wherein the one or more vehicle functions comprise smart regenerative charging and automatic start/stop functions.

17. The vehicle of claim 11, wherein the battery health metric comprises a time-based metric, and wherein the battery health metric is updated at a regular interval based on (i) the battery service time during the regular interval and (ii) a weighting factor determined based on the battery state of charge and the battery temperature during the regular interval.

18. The vehicle of claim 17, wherein the weighting factor determined based on the battery state of charge and the battery temperature has an inverse relationship with the battery state of charge, and a direct relationship with the battery temperature.

19. The vehicle of claim 11, wherein the battery refresh threshold comprises a threshold change in the battery health metric, and wherein performing the battery refresh operation on the first vehicle battery responsive to determining that the battery health metric is above the battery refresh threshold comprises determining that a change in the battery health metric is greater than the threshold change in the battery health metric.

20. The vehicle of claim 19, wherein the change in the battery health metric comprises a change in the battery health metric since a performance of a last battery refresh operation.

* * * * *